May 23, 1939.　　　R. J. ANATER　　　2,159,123
ROLLING MILL MANDREL
Filed Nov. 9, 1936
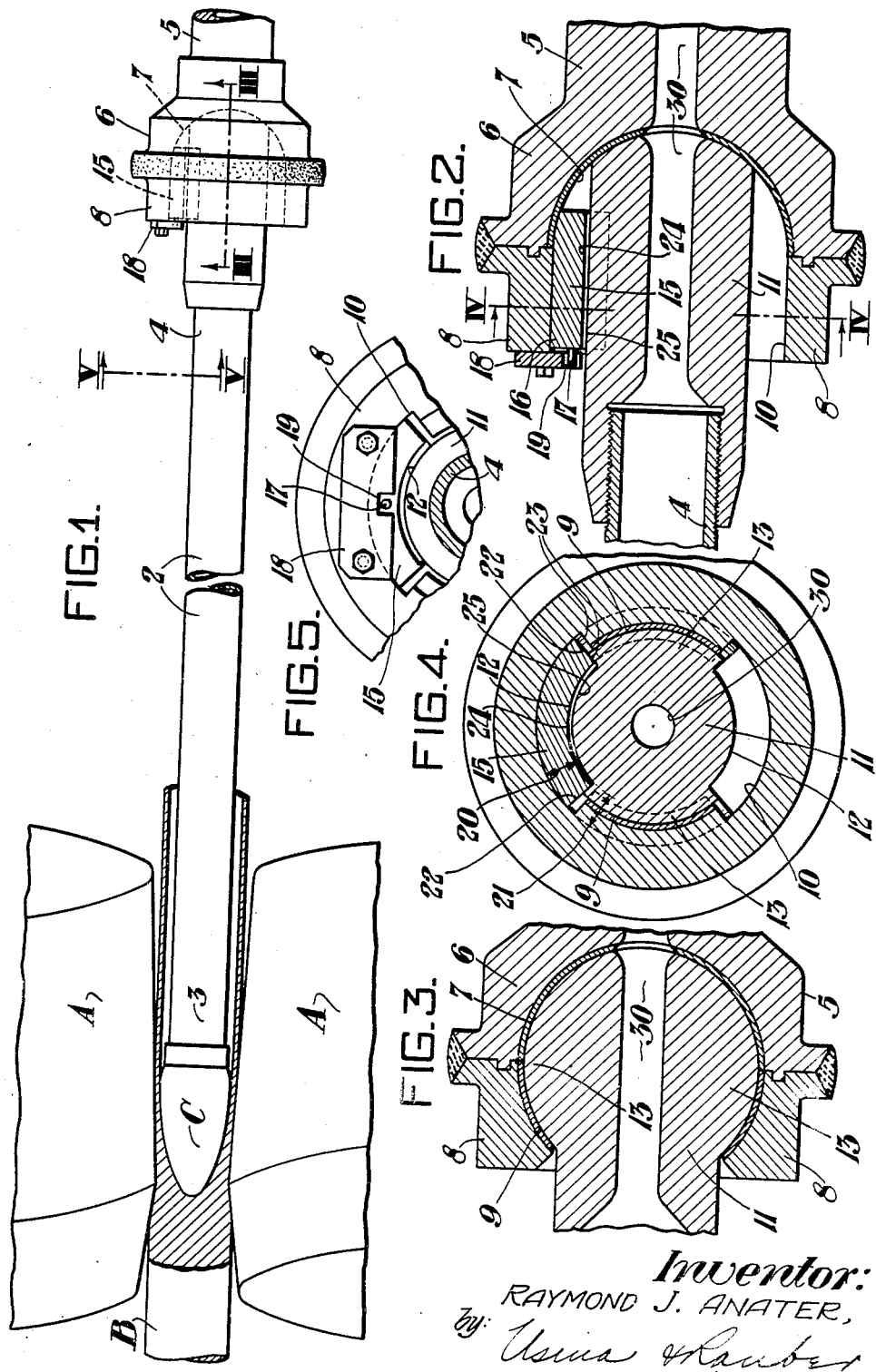
Inventor:
RAYMOND J. ANATER,
by his Attorneys.

UNITED STATES PATENT OFFICE 2,159,123

ROLLING MILL MANDREL

Raymond J. Anater, Dravosburg, Pa., assignor to National Tube Company, a corporation of New Jersey Application November 9, 1936, Serial No. 109,973

2 Claims. (Cl. 80—13)

This invention relates to flexible couplings and more particularly to a flexible coupling for the mandrel bar and thrust spindle of seamless tube mills although not limited thereto.

In the manufacture of seamless tubes by the Mannesmann or Stiefel process a helical motion is imparted to the workpiece by the rolls rotating it on its axis and at the same time advancing it over a mandrel suitably placed in the path of travel of the workpiece. The forward end of the mandrel carries a piercing point or plug while the rear end is attached to a thrust spindle which permits the mandrel to rotate with the advancing workpiece. Heretofore the common method of attaching the mandrel to the thrust spindle has been by a rigid joint which throws excessive and uncontrollable loads on the thrust spindle bearing.

It is accordingly an object of the present invention to provide a very efficient flexible coupling which is cheap and easy to manufacture.

Another object is to provide a joint between the mandrel bar and thrust spindle of a seamless tube rolling mill which will permit universal alignment of the mandrel bar to the thrust spindle and thereby relieve the thrust spindle of excessive loads due to misalignment and permit it to absorb a greater normal thrust load.

The foregoing and other objects will be apparent after referring to the drawing, in which:

Figure 1 is a plan of the device of the invention as used in connection with a conventional type of seamless type of tube mill;

Figure 2 is an enlarged sectional elevation;

Figure 3 is a sectional view on the line III—III of Figure 1;

Figure 4 is a sectional view on the line IV—IV of Figure 2; and

Figure 5 is a fragmentary view on the line V—V of Figure 1.

In the drawing a pair of conventional metal working rolls are designated by the letter A and the workpiece being acted upon thereby by the letter B. Suitably positioned between the rolls A is a mandrel bar 2 carrying a piercing point or plug C at its forward end 3.

A thrust spindle 5 is flexibly connected to the rear end 4 of the mandrel bar 2 by a ball and socket joint 6.

Thrust spindle 5 is provided with a concaved hemi-spherical surface 7 and a cylindrical head or extension 8 is affixed thereto by welding or other suitable means. The cylindrical head or extension member 8 is provided with a pair of oppositely disposed slots 10 extending throughout the length thereof over an arc of approximately 100 degrees.

A ball shaped head 11 is attached to the rear end 4 of the mandrel bar 2. This head 11 is provided with a pair of oppositely disposed slots or cutout portions 12 on its periphery which extend parallel to its longitudinal axis throughout an arc of approximately 90 degrees; thereby providing circumferential tongue portions 13 which extend over arcs of approximately 90 degrees. The tongue portions 13 are slightly smaller than the 100 degree slots 10 of the head 8 so that the ball shaped head 11 can be readily inserted into the spherical cavity 9 formed by the head 8 and concave surface 7 of the thrust spindle 5. After the head 11 is inserted into the cavity 9, the heads 8 and 11 are rotated 90 degrees with respect to one another, bringing the slots 10 and 12 into alignment. A suitably shaped key 15 is then inserted through one of the aligned slots 10 and 12 and extends into the spherical cavity 9. This key 15 is provided with a dowel pin 17 extending outwardly from the end 16 thereof. A retaining plate or cover 18 having a slot 19 to loosely engage the pin 17 is secured to the head 8.

It will be noted that the thickness 20 of the key 15 is somewhat less than the depth 21 of the slots 10 and 12 and that therefore the keying action is between the radial surfaces 22 of the key 15 and the radial surfaces 23 of the slots 10 and 12 with sufficient clearance between the inner surface 24 of the key 15 and the outer surface 25 of the slot 12 to permit movement of the head 11 in the hemi-spherical concavity 7.

The mandrel bar 2 and thrust spindle 5 may, if desired, be provided with a bore 30 extending therethrough which provides a passageway for the delivery of a cooling fluid to the plug or point C.

While I have shown and described a specific embodiment of my invention it will be understood that I do not wish to be limited exactly thereto since various modifications may be made without departing from the scope of my invention.

I claim:

1. In combination with a seamless pipe or tube mill comprising at least two power-actuated metal-working rolls and an intermediately disposed mandrel, a rotatable compression mandrel bar for supporting said mandrel intermediate said metal-working rolls, a rotatable thrust spindle, and means for flexibly connecting said mandrel bar and said rotatable thrust spindle; said means being adapted for rotation with said rotatable mandrel bar and said rotatable thrust spindle and comprising a ball on one of the connected members, a socket on the other of said connected members, means for permitting the entry and withdrawal of said ball with respect to said socket, and means for connecting said ball and said socket for conjoint rotation.

2. In combination with a seamless pipe or tube mill comprising at least two power-actuated metal-working rolls and an intermediately disposed mandrel, a rotatable compression mandrel bar for supporting said mandrel intermediate said metal-working rolls, a rotatable thrust spindle, and means for flexibly connecting said rotatable mandrel bar and said rotatable thrust spindle; said means being adapted for rotation with said rotatable mandrel bar and said rotatable thrust spindle and comprising a ball on the rearward end of said rotatable mandrel bar, a socket on the forward end of said rotatable thrust spindle, means for permitting the entry and withdrawal of said ball with respect to said socket, and means for connecting said ball and said socket for conjoint rotation.

RAYMOND J. ANATER.